United States Patent

Demuro et al.

[11] Patent Number: 5,939,856
[45] Date of Patent: Aug. 17, 1999

[54] BATTERY AND CHARGING SYSTEM USING SWITCHABLE CODING DEVICES

[75] Inventors: David M. Demuro, Snellville, Ga.; Joseph Patino, Pembroke Pines; Jose' Maria Fernandez, Sunrise, both of Fla.

[73] Assignee: Motorola, Inc., Schaumburg, Ill.

[21] Appl. No.: 08/866,280

[22] Filed: May 30, 1997

[51] Int. Cl.⁶ .................................................. H02J 7/00
[52] U.S. Cl. .................................................. 320/106
[58] Field of Search ........................................... 320/106

[56] References Cited

U.S. PATENT DOCUMENTS

| | | | |
|---|---|---|---|
| 5,534,765 | 7/1996 | Kreisinger et al. | 320/106 |
| 5,572,110 | 11/1996 | Dunstan | 320/106 |
| 5,576,612 | 11/1996 | Garret et al. | 320/54 |
| 5,684,387 | 11/1997 | Patino | 320/106 |
| 5,717,307 | 2/1998 | Barket et al. | 320/106 |

*Primary Examiner*—Peter S. Wong
*Assistant Examiner*—Gregory J. Toatley, Jr.
*Attorney, Agent, or Firm*—Felipe J. Farley

[57] ABSTRACT

A battery and charging system including a charger (200) that provides a current and a battery (107) having at least one cell (108) that can be charged by the current provided by the charger (200). The battery (107) includes a memory (110) that stores battery information and a coding resistor (111) indicative of battery type. A battery switching circuit (113, 114) coupled to the memory (110) and the coding resistor (111) switches the memory (110) into contact with the charger (200) when the charger (200) is capable of reading the memory (110). Otherwise, the battery switching circuit (113, 114) switches the coding resistor (111) into contact with the charger (200).

15 Claims, 2 Drawing Sheets

BATTERY AND CHARGING SYSTEM USING SWITCHABLE CODING DEVICES

TECHNICAL FIELD

This invention relates in general to batteries and chargers for batteries, and more specifically to batteries having coding devices recognizable by chargers.

BACKGROUND

Secondary, or rechargeable, batteries often include circuitry for identifying the battery type to a charger or host device to which a battery can be coupled. This is advantageous since different types of batteries, such as nickel cadmium batteries or lithium batteries, can require different charging regimes. One commonly used identification device is a coding resistor. A pull-up resistor in the charger applies a bias to the coding resistor in the battery, and the charger, by way of an analog-to-digital (A/D) converter, is able to determine the resistor value by measuring the voltage at the junction of the voltage divider formed by the pull-up resistor in the charger and the coding resistor in the battery. The charger can then identify the type of battery from the resistor value.

A disadvantage of the coding resistor identification system is that resistor tolerance and accuracy of the A/D converter limits the number of different resistors which can be identified by the charger. Typically, about sixteen (16) different battery types can be differentiated using the coding resistor approach.

One method of overcoming the limitations of a coding resistor is to embed a memory device, such as an erasable programmable read only memory (EPROM) in the battery. The EPROM typically contains not only battery type information, but specific information related to the charge regime to be used. In addition, "fuel gauge" information can be stored in the EPROM to enable the host device or charger to accurately determine the state of charge of the battery based on the measured battery voltage. However, some chargers are unable to recognize the information provided by an EPROM, which can cause improper or insufficient charging of the battery.

Thus, what is needed is a battery and charging system in which a greater number of battery types can be identified while providing backward compatibility with existing chargers and batteries.

DETAILED DESCRIPTION OF THE PREFERRED EMBODIMENT

Figure 1:
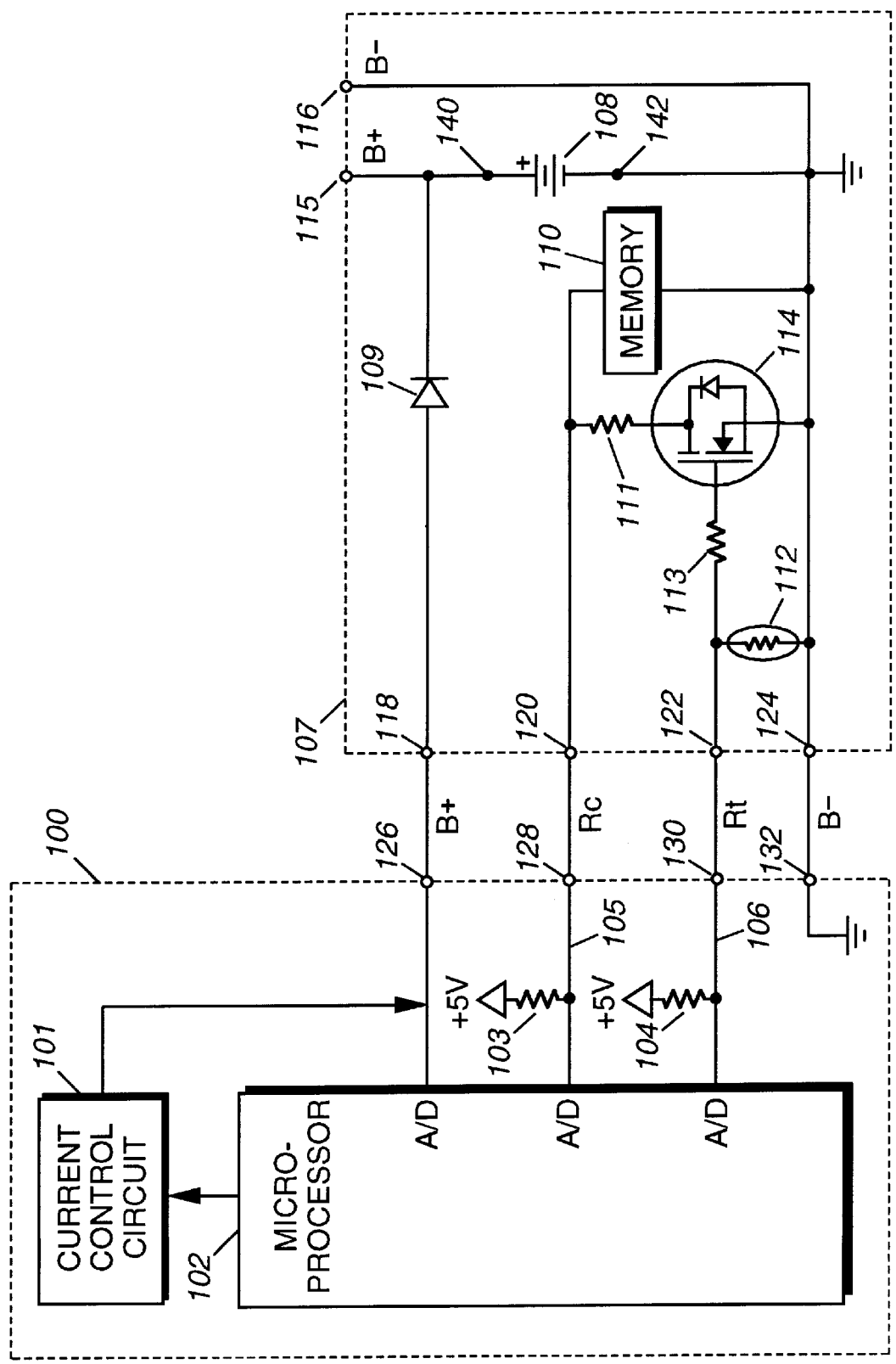
FIG. 1 is an electrical circuit diagram of a conventional charger coupled to a battery that includes identification circuitry in accordance with the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 shows a battery 107 according to the present invention coupled to a conventional charger 100. The battery 107 couples to a host device, such as a computer, a radio, or another portable device, via a positive host contact 115 providing a positive voltage and a negative host contact 116 providing a ground voltage. The battery 107 interfaces with the charger 100 via a positive charger contact 118 for receiving a positive voltage from the charger 100, a coding contact 120 to which switchable coding devices are coupled, a thermistor contact 122 for providing temperature information to the charger 100, and a negative charger contact 124 for providing a ground voltage.

The conventional charger 100 includes interfaces for coupling to the battery 107 when charging the battery 107. More particularly, the charger 100 includes a positive interface 126, a coding interface 128, a thermistor interface 130, and a negative interface 132 that are respectively coupled to the positive charger contact 118, the coding contact 120, the thermistor contact 122, and the negative charger contact 124 of the battery 107. The charger 100 further includes a microprocessor 102 for identifying a battery to which the charger 100 is coupled and a current control circuit 101 for providing a variable current to a battery based on control information provided by the microprocessor 102. A first pull-up resistor 103 is coupled to a positive voltage, such as five (5) volts, and to an $R_c$ line 105, which connects the coding interface 128 to an A/D input of the microprocessor 102. A second pull-up resistor 104 is coupled to the positive voltage and to an $R_t$ line 106, which connects the thermistor interface 130 to another A/D input of the microprocessor 102. Still another A/D input of the microprocessor 102 is coupled to the positive interface 126.

The battery 107 comprises a cell arrangement 108 that includes at least one cell. Preferably, a plurality of secondary cells are included in the cell arrangement 108. The cells 108 discharge to provide power to the host device (not shown) and are recharged by the charger 100. The cell arrangement 108 has a positive terminal 140 that provides a positive voltage, B+, and that is coupled to the positive host contact 115. A negative terminal 142 of the cell arrangement 108 provides a ground voltage and is coupled to the negative host contact 116 and the negative charger contact 124. A diode 109 provides isolation between the cell or cells 108 and the charger 100. More specifically, the cathode of the diode 109 is coupled to the positive terminal 140, and the anode of the diode 109 is coupled to a positive charger contact 118 by which current is received from the charger 100.

The battery 107 further includes a thermistor 112 coupled between the negative terminal 142 and the thermistor contact 122. As will be understood by one of ordinary skill in the art, the thermistor 112 permits the microprocessor 102 included in the charger 100 to monitor battery temperature during charging through the $R_t$ line 106 coupled to the battery 107 via the thermistor interface 130.

According to the present invention, a memory 110, such as an EPROM included in the battery 107, stores battery information, such as battery type, charging scheme to be used, and fuel gauge information regarding the state of charge of the battery. The memory 110 is coupled between the negative terminal 142 of the cell arrangement 108 and the coding contact 120, by which the battery 107 is coupled to an $R_c$ line 105 of the charger 100.

However, older chargers, such as the charger 100, are often incapable of recognizing the memory 110 or using the information stored therein. Therefore, the battery 107 includes a coding resistor 111 as well as the memory 110. Additionally, the battery 107 includes a transistor 114, such as a p-channel field effect transistor (PFET) having a source coupled to the negative terminal 142 and a drain coupled to the coding resistor 111. A bias resistor 113 is coupled between the gate of the transistor 114 and the thermistor contact 122. In this manner, both the coding resistor 111 and the memory 110 are coupled to an $R_c$ line 105 of the charger 100 via the coding contact 120.

When an older charger, such as the charger 100, is coupled to the battery 107 according to the present invention, a high bias signal on the bias resistor 113 is provided by the pull-up resistor 104. This results in the coding resistor 111 being switched into the circuit by the transistor 114. Since the charger 100 was not designed to take advantage of enhanced features provided by the memory 110, the memory 110 is shunted by the coding resistor 111 and the transistor 114 and is therefore not used by the charger 100.

According to the present invention, the improved battery 107 can be recognized by an older charger 100 through use of a coding resistor 111 that can be selectively coupled to the charger 100 by a battery switching circuit, e.g., the bias resistor 113 and the transistor 114. As a result, the battery 107 can be recognized by the charger 100 and charged correctly. The battery 107 also includes a memory 110 for storing battery information, such as type information, charging information, and fuel gauge information. When the battery 107 is coupled to a charger capable of using the stored information, the memory 110, rather than the coding resistor 111, is switched into contact with the charger 100. The battery 107 is therefore ensured of being recognized and charged correctly by both older and newer chargers.

Conventional batteries, on the other hand, include either a coding resistor or a memory. Consequently, a user must be careful to charge a battery with a coding resistor using only an older charger, such as charger 100, that recognizes the coding resistor. The user must also be careful to charge a newer battery with a memory using only a newer charger that recognizes the memory. If a conventional battery is coupled to an incompatible charger, improper or insufficient charging can result, possibly damaging the battery and causing safety hazards.

Figure 2:
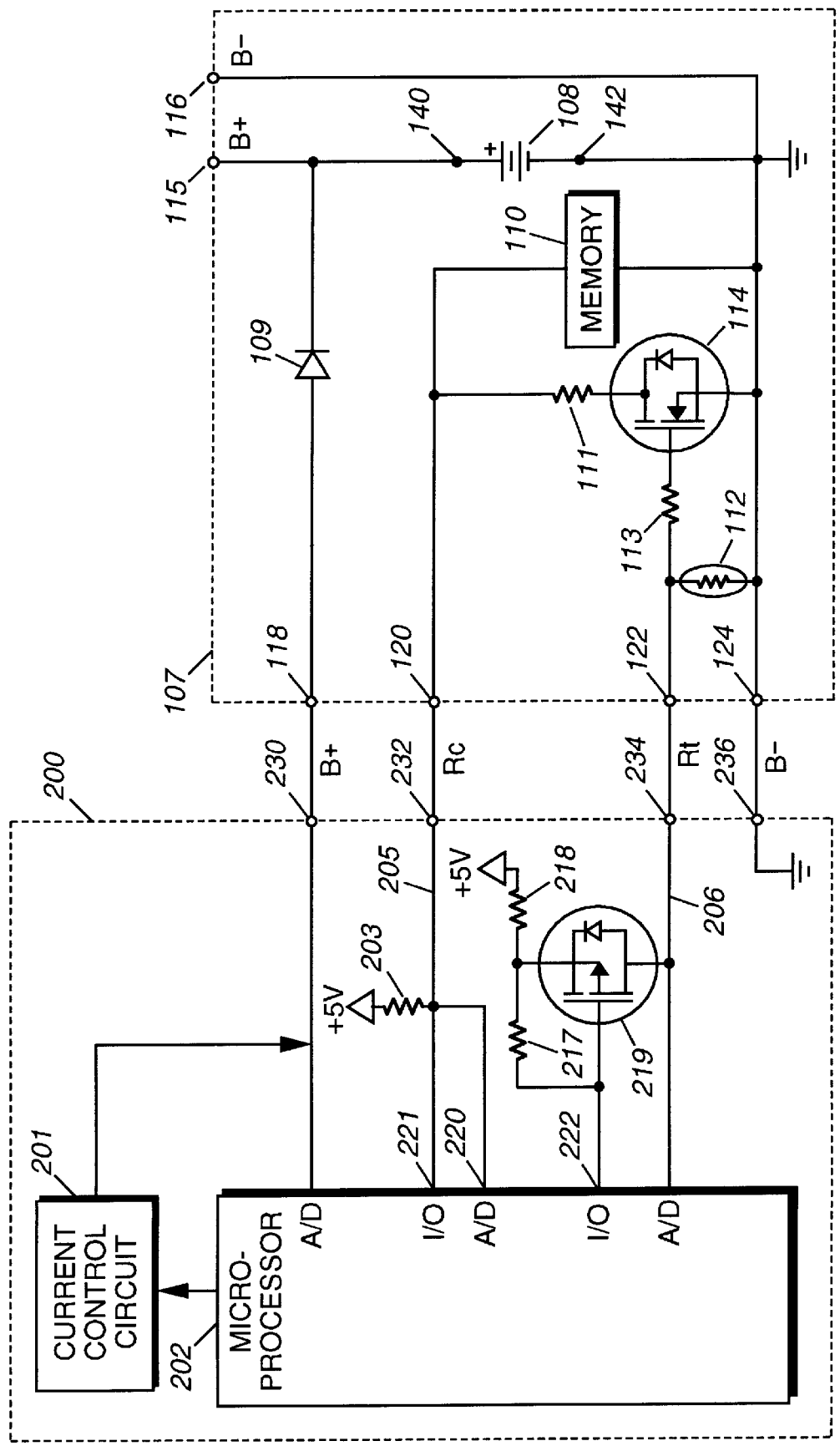
FIG. 2 is an electrical circuit diagram of a battery that includes identification circuitry in accordance with the present invention and a charger capable of identifying battery type of both conventional batteries and the battery according to the present invention.

Referring next to FIG. 2, an electrical circuit diagram shows a battery and charging system according to the present invention. The system includes not only the battery 107, but also a backward compatible charger 200 which, according to the present invention, can recognize batteries with memories, batteries with coding resistors, and batteries that include both memories and coding resistors. Therefore, the charger 200 can charge the battery 107 or a different battery (not shown) having a different coding device. The battery 107 includes elements similar to those called for in FIG. 1, and such elements are represented by the same reference numbers.

The charger 200 includes a current control circuit 201 for varying the amount of current provided to the battery 107 in accordance with control information provided by a microprocessor 202. The charger 200 is coupled to the respective battery contacts 118, 120, 122, 124 via a positive interface 230, a coding interface 232, a thermistor interface 234, and a negative interface 236. A first A/D input of the microprocessor 202 is coupled to the positive interface 230. A pull-up resistor 203 is coupled between a positive voltage supply providing a positive voltage, such as five (5) volts, and an $R_c$ line 205, which connects the coding interface 232 to a second A/D input 220 of the microprocessor 202 and to a first input/output port 221. The thermistor interface 234 is coupled to a third A/D input of the microprocessor 202 by an $R_t$ line 206.

According to the present invention, the charger 200 further includes a charger switching circuit for selectively enabling the A/D input 220 to read a battery coding resistor, such as the coding resistor 111, or to enable the input/output port 221 to read a battery memory, such as the memory 110. Specifically, rather than a fixed pull-up resistor on the $R_t$ line 206, the charger 200 incorporates a transistor 219, such as an n-channel field effect transistor (NFET). Preferably, the drain of the transistor 219 is coupled to the $R_t$ line 206, the gate of the transistor 219 is coupled to a second input/output port 222 of the microprocessor 202 via a resistor 217, and the source of the transistor 219 is coupled to the positive voltage supply (not shown) via a pull-up resistor 218.

In order to read a coding resistor, such as the coding resistor 111, the microprocessor 202 switches on the transistor 219, which connects the pull-up resistor 218 to the positive voltage supply, thereby providing a high bias signal on the bias resistor 113 included in the battery 107. In this way, the battery transistor 114 is switched on to shunt the memory 110 and couple the coding resistor 111 to the A/D input 220 by the $R_c$ line 205, enabling the microprocessor 202 to measure the value of the coding resistor 111 and determine battery type.

When the battery is a newer battery containing a memory, such as the memory 110, the control line from the input/output port 222 is used to switch off the transistor 219, thereby disconnecting the pull-up resistor 218 from the positive voltage supply. This results in switching off the transistor 114 in the battery 107, which disconnects the coding resistor 111 from the $R_c$ line 205. The memory 110 can then be read by microprocessor 202 via the input/output port 221.

By way of example only, the resistors described above in reference to the charger 200 and the battery 107 can have the values indicated in the following table. It will be appreciated that other values could be alternatively used to achieve equivalent switching results.

TABLE 1

RESISTOR VALUES

| Resistor Ref. Number | Value |
| --- | --- |
| 103 | 10 kilo ohms (kΩ) |
| 104 | 10 kΩ |
| 111 | 100 Ω–68 kΩ |
| 112 | 10 kΩ nominal, changes with temperature |
| 113 | 100 kΩ |
| 203 | 10 kΩ |
| 217 | 100 kΩ |
| 218 | 10 kΩ |

In summary, the battery described above includes both a coding resistor and a memory so that the battery can be recognized and properly charged by both older and newer chargers. As a result, the user of the backward compatible battery as described can use either type of charger and is not forced to purchase a newer charger just because he has purchased a newer battery for his host device. Use of the battery according to the present invention is therefore relatively safe and inexpensive.

The battery and charging system described above can also include a backward compatible charger that can safely and properly charge a battery with a coding resistor, a battery with a memory, or a battery that includes both, such as the battery according to the present invention. The improved charger includes a charger switching circuit that can be used to selectively read either the coding resistor or the memory of the disclosed battery. Consequently, battery information including type, state of charge, and charging regime can be conveniently read by coupling a charger microprocessor to the battery memory. The type information can then, if desired, be verified by reference to the coding resistor included in the battery.

It will be appreciated by now that there has been provided an improved battery and charging system that includes a backward compatible battery having both a memory and a coding resistor and a backward compatible charger capable of reading both a battery coding resistor and a battery memory.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery and charging system, comprising:
   a charger that provides a current; and
   a battery having at least one cell that can be charged by the current supplied by the charger, the battery comprising:
      a memory that stores battery information;
      a coding resistor indicative of battery type; and
      a battery switching circuit coupled to the memory and the coding resistor for coupling the memory to the charger when the charger is capable of reading the memory and, otherwise, for coupling the coding resistor to the charger.

2. The battery and charging system of claim 1, wherein the charger is capable of charging a different battery, and wherein the charger further comprises:
   a current control circuit for providing the current; and
   a microprocessor coupled to the current control circuit for reading a memory of the different battery when the different battery includes a memory and, otherwise, for determining battery type from a coding resistor of the different battery.

3. The battery and charging system of claim 1, wherein the battery switching circuit comprises:
   a transistor coupled to the coding resistor and the memory; and
   a bias resistor coupled between the transistor and the charger.

4. The battery and charging system of claim 3, wherein:
   the at least one cell has a positive terminal and a negative terminal; and
   the transistor has a source coupled to the negative terminal.

5. The battery and charging system of claim 4, wherein:
   the memory is coupled between the negative terminal and a coding contact coupled to the charger;
   the coding resistor is coupled between the coding contact and a drain of the transistor; and
   the bias resistor is coupled between a gate of the transistor and a thermistor contact coupled to the charger.

6. The battery and charging system of claim 1, wherein the charger comprises:
   a current control circuit for providing the current;
   a microprocessor coupled to the current control circuit; and
   a charger switching circuit for switching the memory of the battery into contact with a first input/output port of the microprocessor and the coding resistor of the battery into contact with a first analog-to-digital (A/D) input of the microprocessor.

7. The battery and charging system of claim 6, wherein the charger switching circuit includes:
   a transistor having a drain coupled to a second A/D input of the microprocessor and a gate coupled to a second input/output port of the microprocessor;
   a bias resistor coupled between a source of the transistor and the gate of the transistor; and
   a pull-up resistor coupled to the source of the transistor.

8. A battery capable of being charged by a charger, the battery comprising:
   at least one cell having a positive terminal and a negative terminal;
   a memory that stores battery information;
   a coding resistor indicative of battery type; and
   a battery switching circuit coupled to the memory and the coding resistor for coupling the memory to the charger when the charger is capable of reading the memory and, otherwise, for coupling the coding resistor to the charger.

9. The battery of claim 8, wherein the battery information includes type information, information about charging regime, and fuel gauge information.

10. The battery of claim 8, further comprising a thermistor coupled between the negative terminal and the charger to provide temperature information during charging.

11. The battery of claim 8, wherein the battery switching circuit comprises:
   a transistor coupled to the coding resistor and the memory; and
   a bias resistor coupled between the transistor and the charger.

12. The battery of claim 11, wherein the transistor has a source coupled to the negative terminal.

13. The battery of claim 12, wherein:
   the memory is coupled between the negative terminal and a coding contact coupled to the charger;
   the coding resistor is coupled between the coding contact and a drain of the transistor; and
   the bias resistor is coupled between a gate of the transistor and a thermistor contact coupled to the charger.

14. The battery of claim 13, wherein the transistor comprises a p-channel field effect transistor.

15. The battery of claim 13, further comprising a positive host contact coupled to the positive terminal for providing a positive voltage and a negative host contact coupled to the negative terminal for providing a ground voltage.

* * * * *